(12) United States Patent
McDonald

(10) Patent No.: US 10,443,194 B2
(45) Date of Patent: Oct. 15, 2019

(54) FIELD-ASSEMBLY CONCRETE DOWEL BASKET

(71) Applicant: McTech Group, Inc., Hertford, NC (US)

(72) Inventor: Stephen F. McDonald, Hertford, NC (US)

(73) Assignee: McTech Group Inc., Hertford, NC (US)

( * ) Notice: Subject to any disclaimer, the term of this patent is extended or adjusted under 35 U.S.C. 154(b) by 99 days.

(21) Appl. No.: 15/893,409

(22) Filed: Feb. 9, 2018

(65) Prior Publication Data

US 2019/0249375 A1    Aug. 15, 2019

(51) Int. Cl.
| | | |
|---|---|---|
| E01C 11/00 | (2006.01) | |
| E01C 11/14 | (2006.01) | |
| E01C 11/06 | (2006.01) | |

(52) U.S. Cl.
CPC .............. *E01C 11/14* (2013.01); *E01C 11/06* (2013.01)

(58) Field of Classification Search
CPC .................................. E01C 11/14; E04C 5/20
USPC ........................ 52/396.02; 404/134, 135, 136
See application file for complete search history.

(56) References Cited

U.S. PATENT DOCUMENTS

| | | | | |
|---|---|---|---|---|
| 1,613,351 A * | 1/1927 | Klinger | .................. | E04C 5/168 404/135 |
| 2,133,553 A * | 10/1938 | Lord | ........................ | E01C 11/14 404/135 |
| 2,149,844 A * | 3/1939 | George | ...................... | B64C 1/08 403/178 |
| 2,154,748 A * | 4/1939 | Hillberg | .................. | E04C 5/168 404/62 |
| 2,192,570 A * | 3/1940 | Bitney | .................... | E01C 11/14 404/62 |
| 2,193,129 A * | 3/1940 | Geyer | ...................... | E01C 11/14 404/63 |
| 2,296,195 A * | 9/1942 | Varner | .................... | E01C 11/14 404/136 |
| 2,365,550 A * | 12/1944 | Heltzel | ................... | E01C 11/12 404/59 |
| 2,375,361 A * | 5/1945 | Hillberg | .................. | E01C 11/14 52/686 |
| 2,439,428 A * | 4/1948 | Hillberg | .................. | E01C 11/14 404/136 |
| 2,508,443 A * | 5/1950 | Carter | ................... | E01C 11/106 404/60 |

(Continued)

*Primary Examiner* — Thomas B Will
*Assistant Examiner* — Katherine J Chu
(74) *Attorney, Agent, or Firm* — Mehrman Law Office; Michael J. Mehrman

(57) ABSTRACT

A field-assembly dowel basket for concrete construction configured for in-the-field assembly from a small number of component parts, including dowels, dowel sleeves that loosely house the dowels, "W" shaped frame wires that support the dowel sleeves, straight shipping wires that connect dowel basket sections together, and "T" connectors that join the frame sections to the shipping wires. Various embodiments of the field-assembly dowel basket may use different types of dowel sleeves, such as open-channel sleeves, closed-channel sleeves, and sealed-channel sleeves in which tape or another suitable cover is used to seal open-channel sleeves. The dowel sleeves may house different types of dowels, such as rectangular plate dowels and round rod dowels.

20 Claims, 7 Drawing Sheets

(56) References Cited

U.S. PATENT DOCUMENTS

| | | | | |
|---|---|---|---|---|
| 2,552,365 A * | 5/1951 | Bradbury | E01C 11/14 404/62 |
| 2,608,142 A * | 8/1952 | Jacobson | E01C 11/14 404/60 |
| 2,627,793 A * | 2/1953 | White | E01C 11/14 404/62 |
| 2,768,562 A * | 10/1956 | Godwin | E01C 11/14 404/136 |
| 2,864,289 A * | 12/1958 | De Canio | E01C 11/14 404/136 |
| 3,437,017 A * | 4/1969 | Walz | E01C 11/14 404/60 |
| 3,922,103 A * | 11/1975 | Hirato | F16B 2/248 24/339 |
| 3,972,640 A * | 8/1976 | Miller | E01C 11/14 404/62 |
| 4,610,122 A * | 9/1986 | De Clercq | E04C 5/167 24/339 |
| 4,648,739 A * | 3/1987 | Thomsen | E01C 11/227 404/2 |
| 5,518,333 A * | 5/1996 | Cienkus, Jr. | E04H 17/06 256/59 |
| 5,791,816 A * | 8/1998 | McCallion | E04C 5/20 404/136 |
| 5,797,231 A * | 8/1998 | Kramer | E04B 1/483 404/52 |
| 6,092,960 A * | 7/2000 | McCallion | E01C 11/14 404/62 |
| 6,112,494 A * | 9/2000 | Hardy, Jr. | E04C 5/20 52/685 |
| 6,210,070 B1 * | 4/2001 | Shaw | E01C 11/14 404/62 |
| D529,794 S * | 10/2006 | Murray | D8/396 |
| 7,314,334 B1 * | 1/2008 | Bennett | E01C 11/14 404/62 |
| 7,404,686 B2 * | 7/2008 | Volum | F16L 37/098 285/370 |
| 7,461,491 B1 * | 12/2008 | Sorkin | E04C 5/168 52/679 |
| 7,469,515 B2 * | 12/2008 | Minor | E04C 5/167 403/397 |
| 7,874,762 B2 * | 1/2011 | Shaw | E01C 19/504 404/60 |
| 8,302,359 B2 * | 11/2012 | Boxall | E01C 11/14 404/57 |
| 8,356,955 B2 * | 1/2013 | Nadler | E01C 11/14 404/73 |
| 8,381,470 B2 * | 2/2013 | Boxall | E01C 11/14 404/57 |
| 8,511,935 B1 * | 8/2013 | Thomas | E01C 11/14 404/135 |
| 2004/0040247 A1 * | 3/2004 | Morse | E04C 5/166 52/649.8 |
| 2006/0188336 A1 * | 8/2006 | Huber | E04C 5/168 404/136 |
| 2014/0270949 A1 * | 9/2014 | Heady | E01C 11/08 404/70 |
| 2016/0017549 A1 * | 1/2016 | Schenk | E01C 11/14 404/47 |
| 2018/0320373 A1 * | 11/2018 | Rodden | E01C 11/06 |
| 2018/0347610 A1 * | 12/2018 | Zuk | F16B 15/0015 |

* cited by examiner

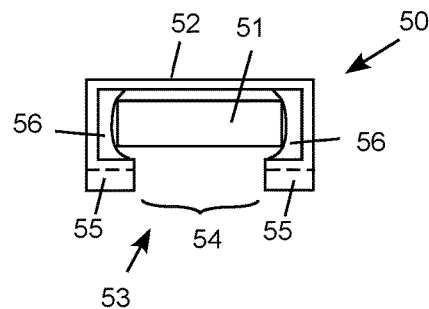
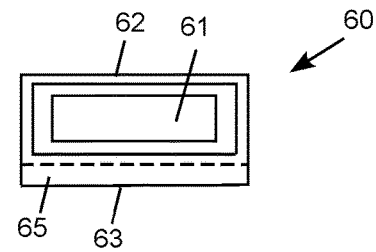
FIG. 5A　　　　　　　FIG. 6A
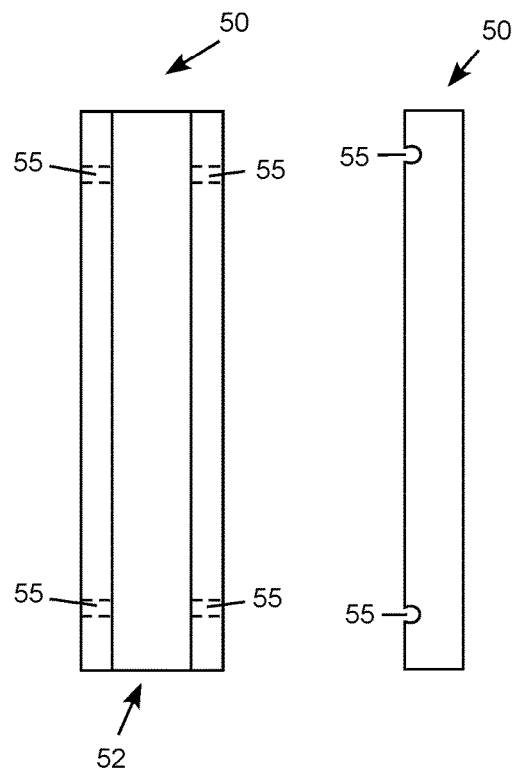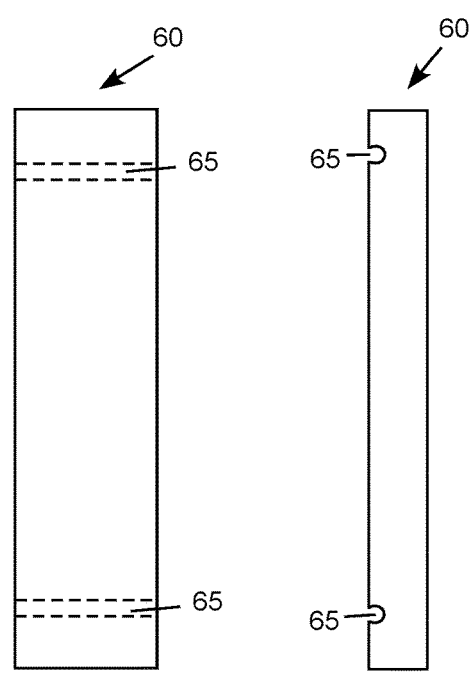
FIG. 5B　FIG. 5C　　FIG. 6B　FIG. 6C

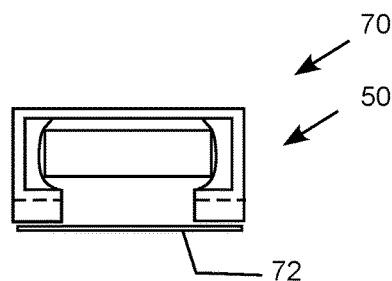
FIG. 7A
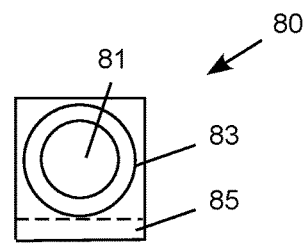
FIG. 8A
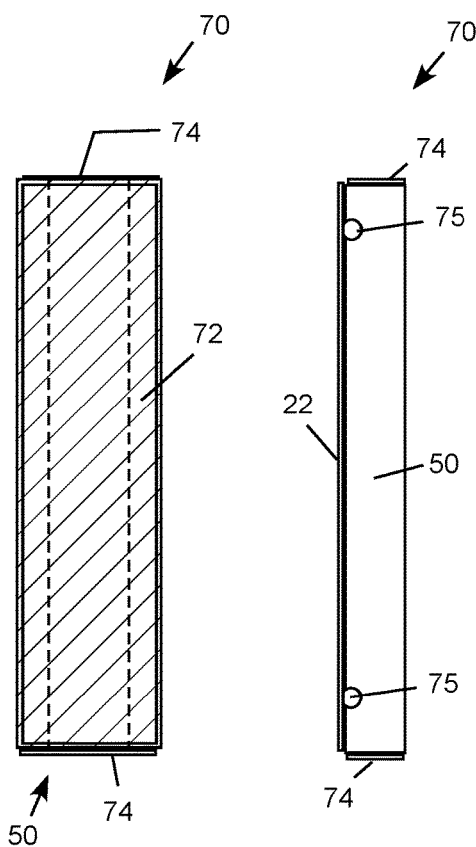
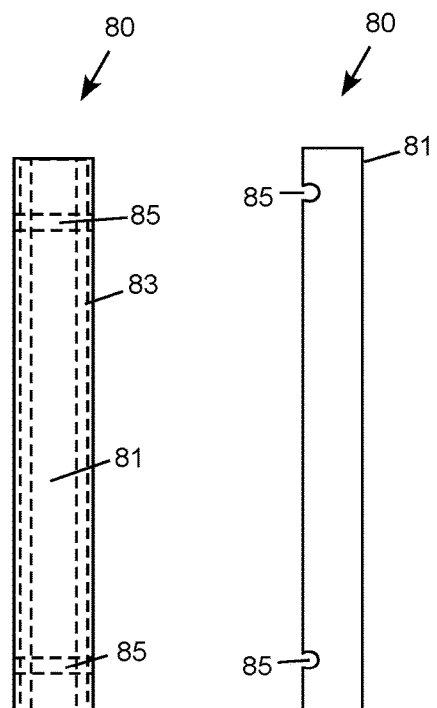
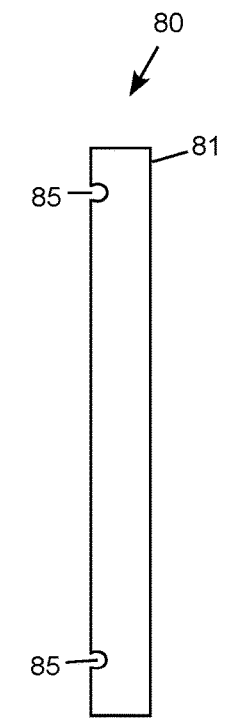
FIG. 7B     FIG. 7C     FIG. 8B     FIG. 8C

FIELD-ASSEMBLY CONCRETE DOWEL BASKET

REFERENCE TO RELATED APPLICATION

The application is related to U.S. patent application Ser. No. 15/399,892 (U.S. Pub. No. 20180195240) filed Jan. 7, 2017, which is incorporated by reference.

TECHNICAL FIELD

The present invention relates to dowel devices suitable for concrete pavement construction and, more particularly, to a field-assembly dowel basket assembled from standardized components on an as-needed, where-needed basis.

BACKGROUND

Dowels are embedded into joints between adjacent slabs of concrete to prevent vertical displacement between the slabs to maintain a smooth pavement surface and increase the strength of the concrete in the region of the joint. While the dowels are embedded in the joints to prevent excessive vertical displacement between the slabs, they may be designed to allow a small amount of horizontal separation as well as vertical and lateral displacement between the slabs to relieve internal stress to accommodate drying shrinkage and thermal expansion and contraction of the slabs. This permits a normal amount of slab movement to prevent excessive cracking while still maintaining a sufficiently smooth top surface of the pavement.

In pavement construction, a series of dowels is typically installed at each expansion joint between adjacent sections or slabs of pavement. A long structure known as a dowel basket is typically used to hold a line of dowels in place at the edge of a section of pavement before the slab is poured. The basket positions each dowel so that half of the dowels will be embedded in the concrete slab to be poured, with the other half to be embedded in the adjacent slab to be poured next. An expansion joint is typically formed into the joint or cut into the dried concrete above the dowel basket at each expansion joint. The pavement is thus constructed section after section, and in some cases mile after mile, with a line of dowels held in place by a dowel basket embedded into the concrete at each expansion joint. A range of pavement structures are constructed in this manner, such as roads, bridges, sidewalk, floors, buildings, and so forth. The term "pavement" for this purpose includes walls, roofs, ceilings, caisson, and other structures as well as roads, bridges, floors and sidewalks. Pavement is typically manufactured from form concrete, but may be made from any suitable material poured in sections.

Constructing a road in this manner requires the dowel baskets to be continually manufactured and made available at the construction site as section after section, and mile after mile, of road is poured. In conventional road construction, the dowel baskets are welded together at a welding shop and then transported, typically by truck, to the construction site. For a long road construction project, a series of welding jobbers may be contracted along the route as the road is constructed. Dowel basket fabrication can be a significant logistical challenge and a major cost factor in road construction. A similar concern can arise in any project utilizing large numbers of joined concrete pavement sections, such as high-rise buildings, sidewalks, bridges, dams, and so forth. At times, dowel basket fabrication may become the critical path item, causing construction crews to sit idle waiting on dowel basket delivery before construction of the project can continue. As a result, there is a persistent need for cost effective solution to dowel basket manufacturing to facilitate concrete pavement construction.

SUMMARY

The present invention meets the needs described above in a field-assembly dowel basket for concrete construction configured for in-the-field assembly from standardized components, including dowels, dowel sleeves, wire frame components, and plastic connectors. This allows a number of standard components to be conveniently transported and stored on construction sites to facilitate on-site assembly of dowel baskets on an as-needed, where-needed basis. Since the dowel basket components are much smaller than assembled baskets, they can be shipped in bulk and stored much more cost effectively. Standardization of components allows mass production, bulk shipping, consolidated inventory management, and avoids the need for ad hoc fabrication for each construction site. On-site fabrication eliminates welding from the dowel basket fabrication process, avoids shipping of fabricated dowel baskets, and allows assembly of dowel basket by construction workers as opposed to highly skilled welding shops.

In view of the foregoing, it will be appreciated that field-assembly concrete dowel baskets represent a significant improvement in concrete construction and, more particularly, in concrete road and sidewalk construction. The foregoing relates only to the exemplary embodiments of the present invention, and that numerous changes may be made therein without departing from the spirit and scope of the invention as defined by the following claims.

BRIEF DESCRIPTION OF THE FIGURES

FIG. 5A is an end view of an open-channel dowel sleeve.
FIG. 5B is a top view of the open-channel dowel sleeve.
FIG. 5C is a side view of the open-channel dowel sleeve.
FIG. 6A is an end view of a closed-channel dowel sleeve.
FIG. 6B is a top view of the closed-channel dowel sleeve.
FIG. 6C is a side view of the closed-channel dowel sleeve.
FIG. 7A is an end view of a sealed-channel dowel sleeve.
FIG. 7B is a top view of the sealed-channel dowel sleeve.
FIG. 7C is a side view of the sealed-channel dowel sleeve.
FIG. 8A is an end view of a dowel sleeve for a rod dowel.
FIG. 8B is a top view of the dowel sleeve for a rod dowel.
FIG. 8C is a side view of the dowel sleeve for a rod dowel.

DETAILED DESCRIPTION

Figure 1:
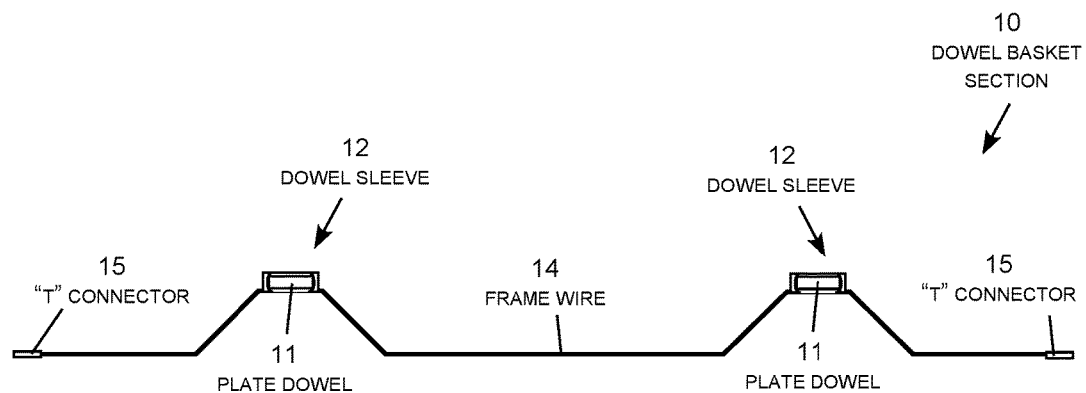
FIG. 1 is a side view of a field-assembly dowel basket section.

Embodiments of the invention may be realized in a field-assembly dowel basket, components for a field-assembly dowel basket, a method for constructing a concrete road or other structure using the field-assembly dowel baskets, and a road or other structure constructed with the field-assembly dowel baskets. Rather than the conventional approach of fabricating dowel baskets at welding shops and transporting the fabricated dowel baskets to the construction site, embodiments of the present invention provide field-assembly dowel baskets assembled at the construction site from a small number of standard components.

The field-assembly dowel basket is assembled from a small number of component parts, including dowels, dowel sleeves that loosely house the dowels, "W" shaped frame wires that support the dowel sleeves, straight shipping wires that connect dowel basket sections together, and "T" connectors that join the frame sections to the shipping wires. Various embodiments of the field-assembly dowel basket may use different types of dowel sleeves, such as open-channel sleeves, closed-channel sleeves, and sealed-channel sleeves in which tape or another suitable cover is used to seal open-channel sleeves. The dowel sleeves may house different types of dowels, such as rectangular plate dowels and round rod dowels.

U.S. patent application Ser. No. 15/399,892 (U.S. Pub. No. 20180195240) describes field-assembly dowel baskets that use a variety of different clips to hold the dowel baskets together. The present disclosure is directed to an alternative type of field-assembly dowel basket that uses dowel sleeves instead of clips to hold the dowels in place. More specifically, the dowel basket described below removably holds the dowels in place within a field-assembly dowel basket frame constructed from dowel sleeves, wire components, and plastic "T" connectors. The dowels, dowel sleeves, wire components, and plastic "T" connectors can therefore be manufactured off-site as unassembled components and transported in bulk to the construction, where they are stored in bulk and assembled in the field on an as-needed, where needed basis. Once assembled, the dowel basket is positioned at the edge of a first concrete slab prior to pouring the slab. The dowel basket holds the dowels in place about midway up the thickness of the slab. A concrete form is positioned around the dowels near the centerline of the dowel basket. The first slab is poured so that about half of the dowels extend into the slab and half extend beyond the slab. After the first slap sets, the form is removed and a second slab is poured over the portions of the dowels that extending beyond the first slab. An expansion joint is formed or cut over the dowel basket at the intersection of the two slabs.

In an illustrative embodiment, each field-assembly dowel basket is formed from a number of dowel basket sections that each removably hold two dowel assemblies in place. Any number of dowel basket sections can be connected together with "T" clips to form a dowel basket of desired length, which typically extends laterally across the road or other structure under construction. Each dowel basket section includes a pair of wire frame side components connected to each other by a pair of dowel sleeves, which each hold a dowel. The dowels or bars are typically rectangular "plate" dowels or round "rod" dowels. The wire frame side components are spaced apart from each other by T" clips "T" connectors and shipping wires. Each wire frame side component is formed from form a single "W" section of wire. As a result, only two types of wire components are required, the "W" shaped frame wire side component, and the straight shipping wires that extend from one pair of "W" shaped frame wire side components across the basket section to an opposing pair of "W" shaped frame wire side components.

The dowel sleeves may be open-channel or closed-channel plastic extrusions sized to loosely receive a dowel bar (e.g., a rectangular "plate" dowel or a round "rod" dowel) while leaving a little space (e.g., in the range of $\frac{1}{16}$ to $\frac{1}{8}$ of an inch on all sides) to allow the dowel to move slightly within the sleeve. Closed-channel sleeves have the advantage of inherently keeping the concrete from infiltrating the sleeve and affixing the dowel to the sleeve. An open-channel sleeve uses less material and may be sealed with tape to prevent the concrete from infiltrating the sleeve along the length of the sleeve to create sealed-channel sleeve. For all types of sleeves, the ends of the sleeves are typically sealed with tape or another type of cover to prevent the concrete from infiltrating the end of the sleeve. Different types of channels may be provided to receive different types of dowels, such as round rod dowels and rectangular plate dowels.

In particular embodiments, the dowel sleeves may be extruded plastic forms, such as polypropylene, polyethylene, polyethylene terephthalate (PET), polyvinyl chloride (PVC) or any other suitable material. The wire components may be manufactured from the type of steel wire typically used in wire mesh for concrete reinforcement. The "T" connectors may be made from a suitable inexpensive plastic such as polypropylene, polyethylene, PET or PVC.

While specific dimensions may vary as a matter of design choice, the following dimensions are typical for an illustrative embodiment. The plate dowels are typically 12 inches long, 2 to 2.5 inches wide, and $\frac{1}{4}$ to $\frac{1}{2}$ inch thick. The rod plate dowels are typically 15 to 18 inches long and $\frac{3}{8}$ to $\frac{3}{4}$ inch in diameter. The dowel sleeves are sized to leave a little space (e.g., in the range of $\frac{1}{16}$ to $\frac{1}{8}$ of an inch on all sides) around the dowel to allow the dowel to move slightly within the sleeve. The dowel-to-dowel spacing is typically 18 to 24 inches. The side-to-side spacing between the "W" wire frames is typically 12 inches. The basket supports the dowels midway in the slab to be poured (e.g., 4 inches for 8-inch thick slab) above the base where the concrete is to be poured. The wire frame components may be made from $\frac{1}{4}$ to $\frac{3}{8}$ inch diameter concrete reinforcement steel wire. The "T" connectors may include sockets configured to receive $\frac{1}{2}$ to $\frac{3}{4}$ inch end portions of the wire frame components. The open slots in the open-channel dowel sleeves and the ends of the dowel sleeves may be covered with masking tape or any other suitable type of cover.

Figure 2:
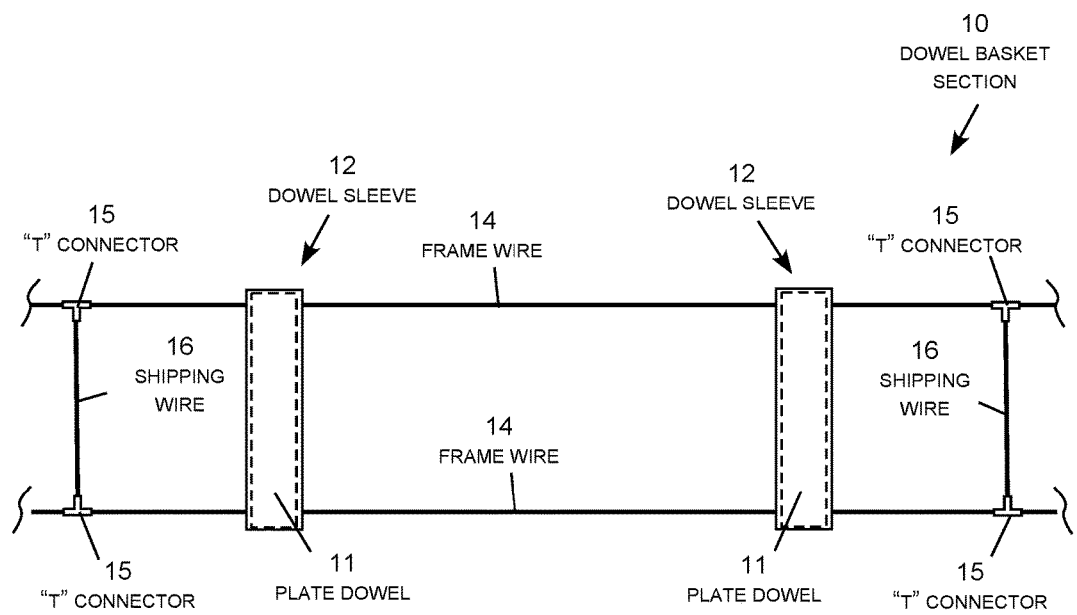
FIG. 2 is a top view of the dowel basket section.

FIG. 1 is a side view and FIG. 2 is a top view of a dowel basket section 10, which includes two dowels 11, each loosely supported within a respective dowel sleeve 12. The dowel sleeves contain grooves that allow the dowel sleeves to snap onto "W" shaped frame wires 14 that supports the dowel sleeves in an elevated position about half way into a concrete slab to be poured over the dowel basket section. A "W" shaped frame wire 14 forms one side of the dowel basket section, which includes two frame wires 14 connected together by "T" connectors 15 and shipping wires 16. The "T" connectors 15 are also used to connect any number of dowel basket sections 10 together to create a dowel basket of desired length, for example spanning across a section of concrete road or floor to be poured. Once the concrete slabs are poured, the dowel basket is embedded in the concrete with the dowels spanning across the joint between adjacent concrete slabs.

Figure 4:
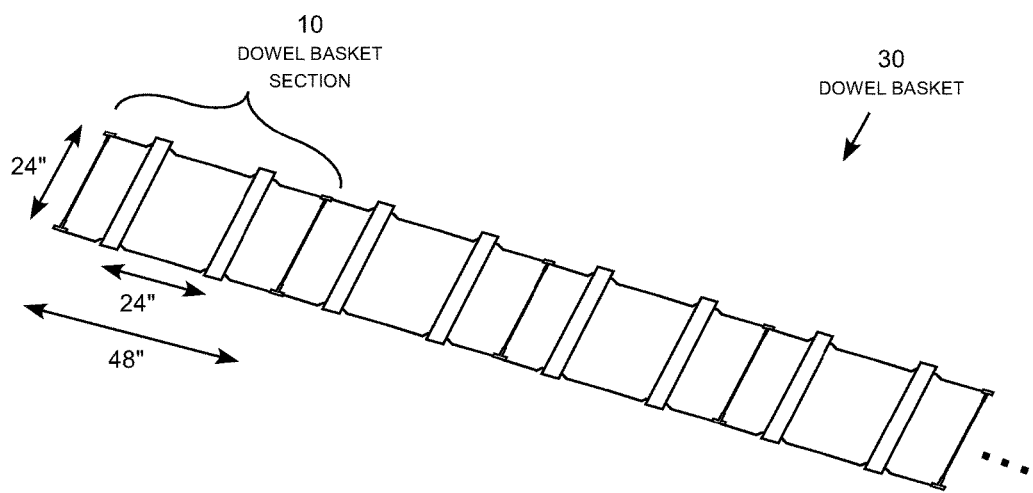
FIG. 4 is a perspective view of a portion of the dowel basket.

FIG. 4 is a perspective view of a portion of an illustrative dowel basket 30 constructed from a number of dowel basket sections 10. In this example, each dowel basket section is 24 inches across (e.g., the dowels are 24 inches long) and 48 inches long from one shipping wire to the next. The lateral dowel spacing is 24 inches and the dowels are suspended to be approximately half way up the concrete slab to be poured over the dowel basket (e.g., dowels suspended at 3 inches for a 6-inch concrete slab, at 4 inches for a 8-inch concrete slab, at 6 inches for a 12-inch concrete slab, and so forth).

Figure 3A:
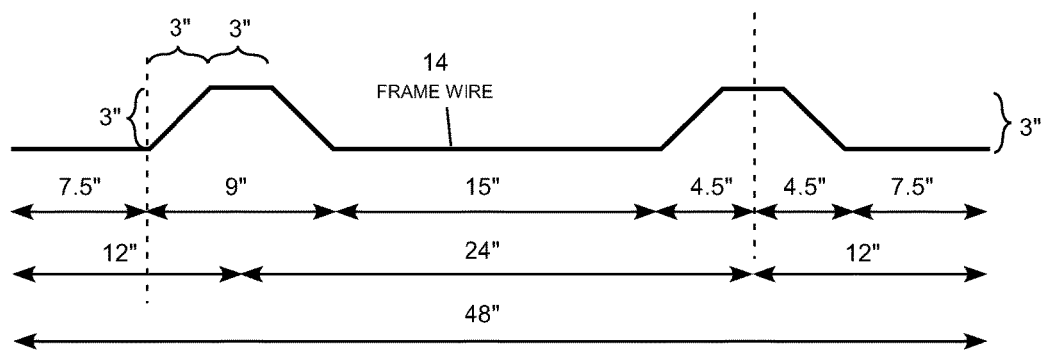
FIGS. 3A-3C are disassembled views of the components of the dowel basket.
Figure 3B:
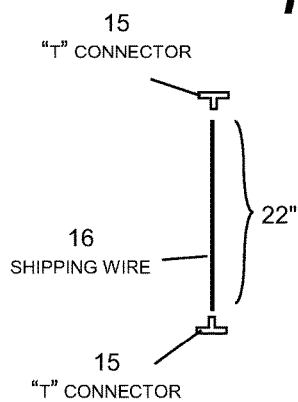
Figure 3C:
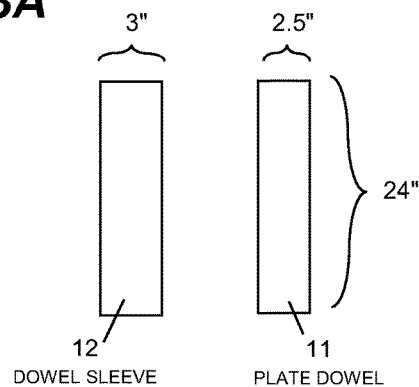

FIGS. 3A-3C are disassembled views of the components of an illustrative embodiment of the dowel basket. The frame wire is 48 inches long with two arches that are each 9 inches long and 3 inches high. The shipping wire is 22 inches long, while the dowels 11 and dowel sleeves 12 are 24 inches long. In this particular example, the dowel sleeves are 3 inches wide, and the dowels are 2.5 inches wide.

FIG. 5A is an end view, FIG. 5B is a top view, and FIG. 5C is a side view of an example type of open-channel dowel sleeve 50 holding a plate dowel 51. The dowel sleeve is a rectangular extrusion formed with a flat, solid top side 52 and a bottom side 53 with a lateral slot 54 on opposing sides of flange portions. The flange portions include recesses 55 sized to receive the frame wires with a tight "snap-in" interference fit. As an option, foam strips 56 may be included on the inside the sleeve above the flange portions to support the dowel 51 and prevent concrete from getting into the sleeve where it could lock the dowel to the sleeve. Masking tape is typically placed over the ends of the dowel during field assembly to prevent concrete from getting into the ends of the sleeve.

FIG. 6A is an end view, FIG. 6B is a top view, and FIG. 6C is a side view of an example type of closed-channel dowel sleeve 60 holding a plate dowel 61. The dowel sleeve is a rectangular extrusion formed with a flat, solid top side 62 and a flat, solid bottom side 63. The bottom side includes recesses 65 sized to receive the frame wires with a tight "snap-in" interference fit. Foam strips are not needed in the embodiment because the closed-channel structure of the dowel sleeve prevents concrete from getting into the sleeve where it could lock the dowel to the sleeve. Again, masking tape is typically placed over the ends of the sleeve during field assembly to prevent concrete from getting into the ends of the sleeve.

FIG. 7A is an end view, FIG. 7B is a top view, and FIG. 7C is a side view of an example type of sealed-channel dowel sleeve 70. This is an alternative approach for using an open-channel sleeve 50 in which masking tape 72 or another suitable cover is attached over the open slot during field assembly to keep concrete out. Masking tape 74 is likewise placed over the ends of the sleeve during field assembly to prevent concrete from getting into the ends of the sleeve. The sealed-channel sleeve may save costs by reducing the amount of plastic in the channel, in exchange for having to apply masking tape over the slot to seal the sleeve in the field. This is not much of an inconvenience because tape is generally placed over the ends of sleeve after the dowel is inserted, so little extra time is required to run a piece of tape over the entire slot.

FIG. 8A is an end view, FIG. 8B is a top view, and FIG. 8C is a side view of an example type of closed-channel dowel sleeve 80 holding a rod dowel 81. The dowel sleeve is a square extrusion formed with a circular bore 83 and a bottom side that includes recesses 85 sizes to receive the frame wire with a tight "snap-in" interference fit. A square extrusion with a square bore may also be used as a matter of design choice. Again in this embodiment, masking tape is typically placed over the ends of the sleeve during field assembly to prevent concrete from getting into the ends of the sleeve.

Figure 9:
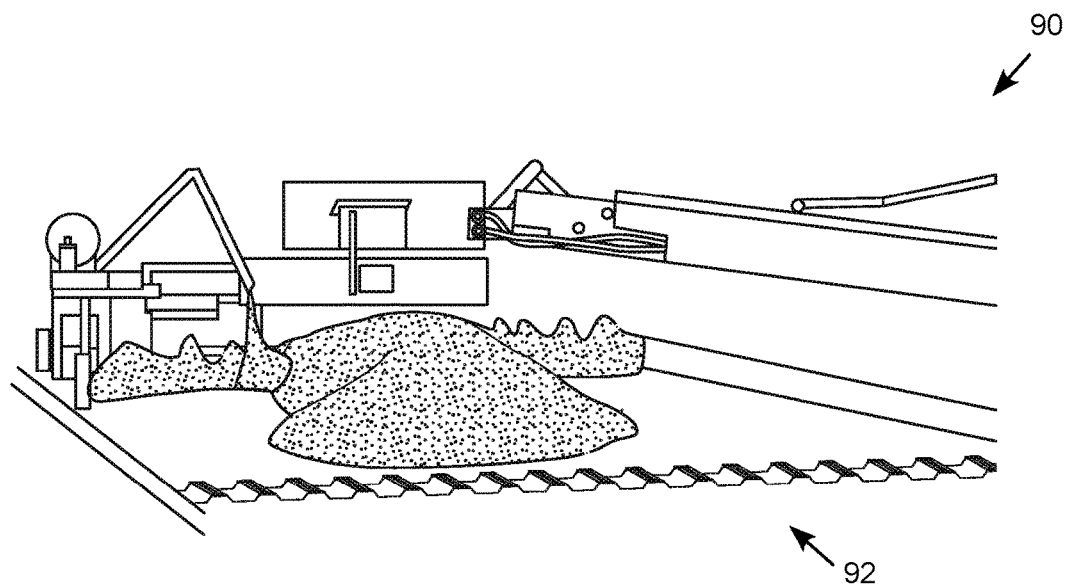
FIG. 9 is a side view a concrete slab with an embedded dowel basket.

FIG. 9 is a perspective view of concrete road formation using the field-assembly dowel basket 92 with plate dowels. The concrete forms are not shown to avoid cluttering the figure.

Figure 10:
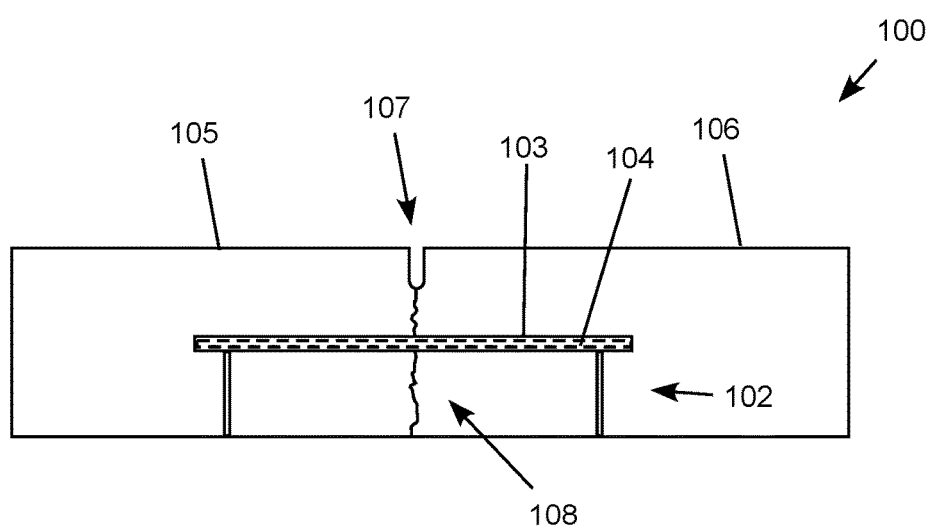
FIG. 10 is a conceptual illustration of a section of road being constructed using field-assembly dowel baskets.

FIG. 10 is a cross-section view of a field-assembly dowel basket 102 spanning an expansion joint between adjacent concrete slabs. In this example, a dowel sleeve 103 loosely housing a dowel 104 spans the joint between the concrete slabs 105 and 106. An expansion joint 107 is created above the dowel sleeve 103, typically by inserting a wood slat or other form into the poured concrete before it sets or cutting the joint into the concrete after it has partially set. The expansion joint 107 facilitates formation of a crack 108 below the joint at the intersection between the slabs, which allows slight horizontal, vertical and lateral movement of the slabs with respect to each other to accommodate thermal expansion and settling. The space between the dowel sleeve 103 and the dowel 104 allows the dowel to "give" a bit within the sleeve to accommodate this slight slab movement to reduce cracking of the concrete.

Figure 11:
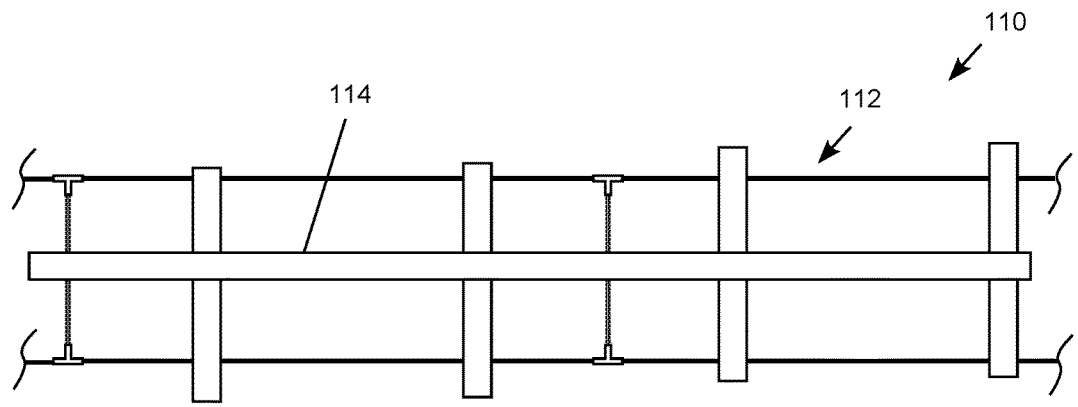
FIG. 11 is a top view of a concrete form with a dowel basket.
Figure 12:
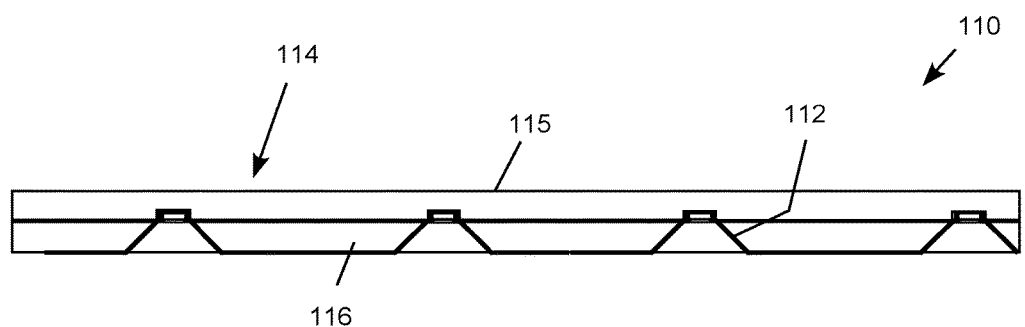
FIG. 12 is side view of the concrete form.
Figure 13:
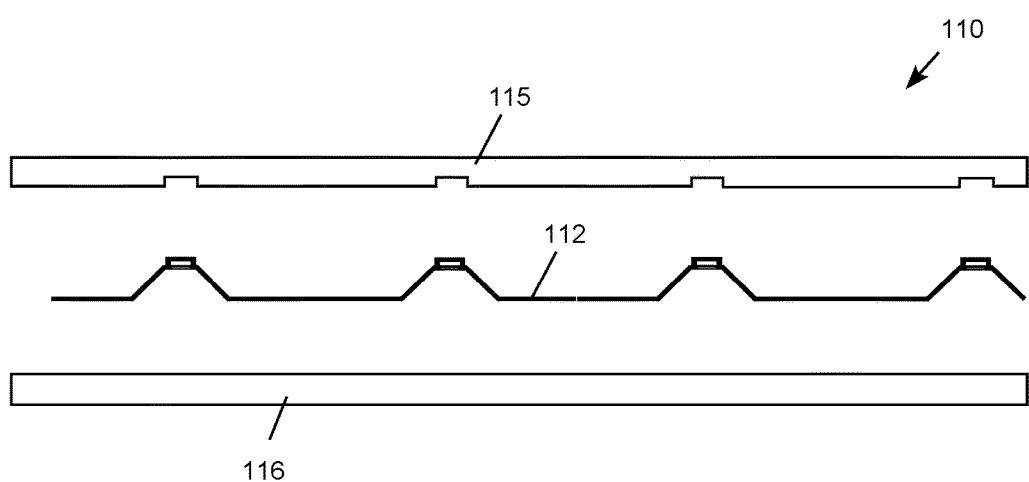
FIG. 13 is side exploded view of the concrete form.
Figure 14:
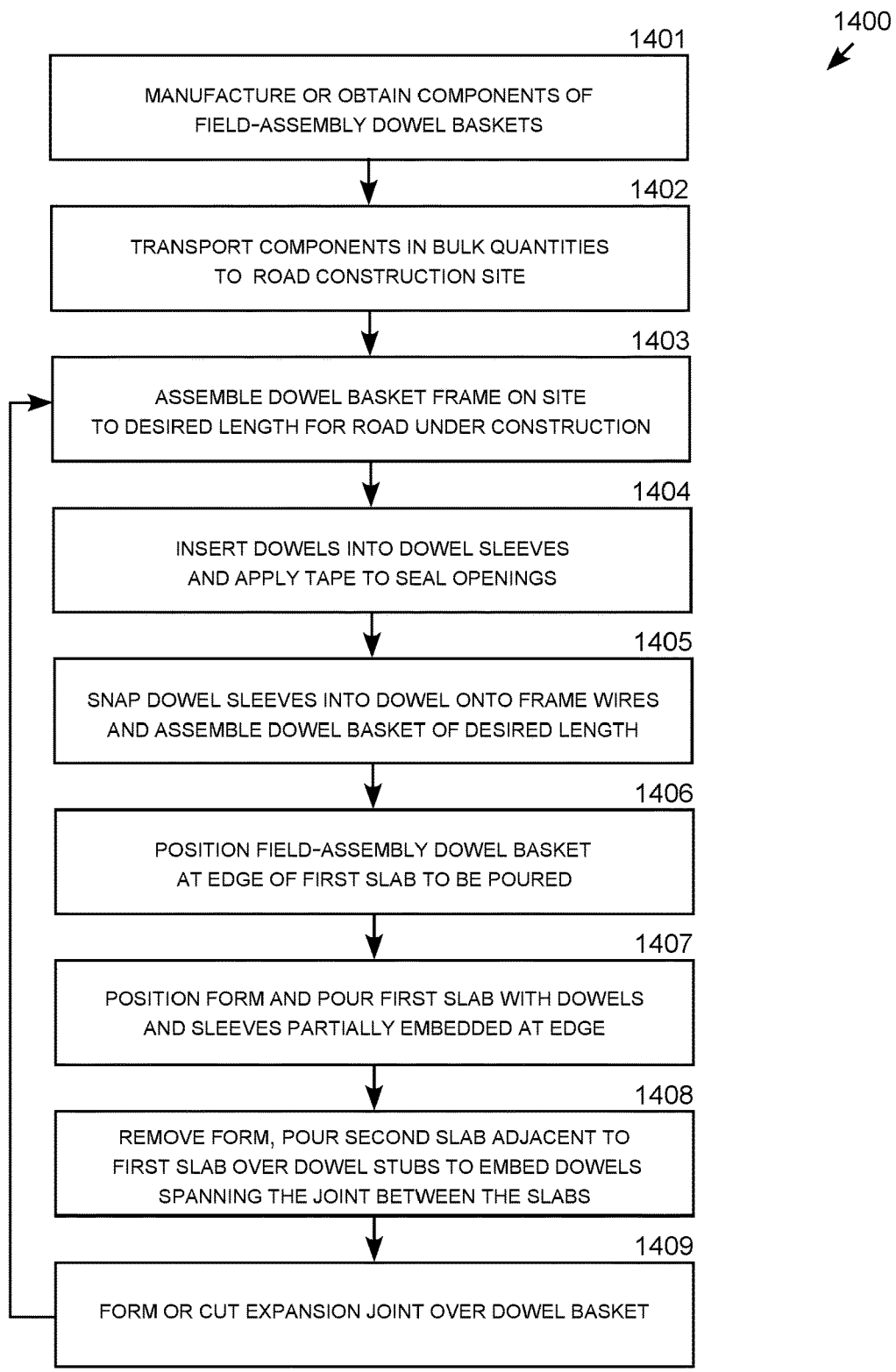
FIG. 14 is a logic flow diagram for constructing a concrete road using the field-assembly dowel baskets.

FIG. 14 is a logic flow diagram 140 for constructing a concrete road using the field-assembly dowel baskets. FIGS. 11-13 illustrate the procedure described in FIG. 14. In step 1401, the components of the field-assembly dowel basket are manufactured at suitable locations away from the road construction site where they are to be used. Alternatively, the components may be obtained from one or more component suppliers. Step 1401 is followed by step 1402, in which the components are transported in bulk quantities to the road construction site. Step 1402 is followed by step 1403, in which a dowel basket is assembled from the components at the construction site on an as-needed, where-needed basis. For jobs using multi-part dowels, step 1403 is followed by step 1404 in which the dowels are inserted into the sleeves and the openings are covered with tape to prevent concrete from infiltrating the sleeve and locking the dowel in place. Step 1404 is followed by step 1405, in which the dowel sleeves are snapped into place onto the "W" shaped frame wires and a dowel basket of desired length is assembled. Step 1405 is followed by step 1406, in which the assembled dowel basket is positioned at the edge of a first slab to be poured.

Step 1406 is followed by step 1407, in which a form is positioned around the dowel basket, as illustrated by the dowel basket and form assembly 110 shown in FIGS. 11-13, and the first concrete slab is poured. In this example, a form 114 is positioned approximately along the center line of the dowel basket 112. The form 114 includes a top rail 115 and a bottom rail 116 with notches cut to fit the dowel sleeves. The top and bottom rails meet to create a wall around the dowel sleeves sufficiently tight to hold back the concrete to be poured. The rails may be made from lumber, plywood, plastic, steel or other suitable materials. Standardized form sections may be provided along with the dowel basket components to facilitate construction site provisioning and inventory management. For example, reusable plastic or metal forms in standard lengths (e.g., 2 feet, 4 feet, 8 feet) for slabs of standard thickness (e.g., 6 inch, 8, inch, 10 inch, etc.) may be available to facilitate construction and minimize the time and waste associated with ad hoc lumber forms.

After the first concrete slab has set sufficiently, step 1407 is followed by step 1408, in which the form is removed and a second concrete slab is poured over the dowel stubs extending from the first slab. Step 1408 is followed by step 1409, in which an expansion joint is formed or cut into the joint between the slabs above the dowel basket.

Although the field-assembly dowel baskets have been illustrated in the context of horizontal pavement construction, it will be appreciated that the dowel basket is well adapted for, but not limited to, road construction. It should be appreciated that the field-assembly dowel baskets can be used for any concrete joint of sufficient size regardless of its intended purpose or orientation. For example, the invention is equally applicable to joints in concrete roads, sidewalks, building floors, walls, ceilings, abutments and other structures. Those skilled in the art will appreciate that the foregoing describes preferred embodiments of the invention and that many adjustments and alterations will be apparent to those skilled in the art within the spirit and scope of the invention as defined by the appended claims.

The invention claimed is:

1. An unassembled field-assembly dowel basket for concrete construction configured for assembly into a dowel basket on an as-needed, where-needed basis, comprising:
a plurality of dowels elongated in a lateral direction;
a plurality of dowel sleeves elongated in the lateral direction configured to loosely house the dowels;
a plurality of wire segments;
a plurality of connectors attachable to the wire segments;
wherein the dowels, dowel sleeves, wire segments and connectors are configured to be assembled into a plurality of dowel basket sections without welding of the wire segments to each other;
wherein the dowel basket sections are configured to be assembled into a dowel basket;
wherein the wire segments of each dowel basket section comprise a pair of opposing frame wires;
wherein each dowel sleeve comprises a pair of recesses, each configured to receive a portion of one of the opposing frame wires through a snap-in interference fit, to position the pair of opposing frame wires to extend in a transverse direction perpendicular to the lateral direction spaced apart from each other in the lateral direction;
wherein each dowel basket section comprises two frame wires, two dowels sleeves supported by the frame wires, two dowels loosely held within respective dowel sleeves, and two connectors;
wherein each connector is configured to connect a shipping wire between the opposing frame wires of a dowel basket section, and to connect aligned frame wires of adjacent dowel basket sections to each other, to assemble the dowel basket sections into a multi-section dowel basket comprising a plurality of dowel basket sections aligned in the transverse direction without welding the dowel basket sections to each other.

2. The field-assembly dowel basket of claim 1, wherein:
the wire segments, the connectors and a removable concrete form extending in the transverse direction between the frame wires are configured to support the dowel sleeves housing the dowels above a base while concrete is poured onto the base over a first portion of the dowel basket on one side of the removable form;
the dowel basket is configured to allow the removable concrete form to be removed after the concrete is poured over the first portion of the dowel basket and before concrete is poured over a second portion of the dowel basket.

3. The field-assembly dowel basket of claim 2, wherein each frame wire has a "W" shape, each shipping wire has a straight shape, and each connector has a "T" shape.

4. The field-assembly dowel basket of claim 3, wherein the wire segments consist essentially of the "W" shape frame wires and the straight shipping wires, and the connectors consist essentially of the "T" shape connectors.

5. The field-assembly dowel basket of claim 1, wherein each dowel sleeve is coextensive in the lateral direction with an associated dowel.

6. An assembled field-assembly dowel basket for concrete construction, comprising:
a plurality of dowels elongated in a lateral direction;
a plurality of dowel sleeves elongated in the lateral direction configured to loosely house the dowels;
a plurality of wire segments;
a plurality of connectors attached to the wire segments;
wherein the dowels, dowel sleeves, wire segments and connectors are assembled into a plurality of dowel basket sections without welding of the wire segments to each other;
wherein the dowel baskets sections are assembled into a dowel basket;
wherein the wire segments of each dowel basket section comprise a pair of opposing frame wires;
wherein each dowel sleeve comprises a pair of recesses, each receiving a portion of one of the opposing frame wires through a snap-in interference fit, to position the pair of opposing frame wires to extend in a transverse direction perpendicular to the lateral direction spaced apart from each other in the lateral direction;
wherein each dowel basket section comprises two frame wires, two dowels sleeves supported by the frame wires, two dowels loosely held within respective dowel sleeves, and two connectors;
wherein each connector connects a shipping wire between the opposing frame wires of a dowel basket section, and connects aligned frame wires of adjacent dowel basket sections to each other, to assemble the dowel basket sections into a multi-section dowel basket comprising a plurality of dowel basket sections aligned in the transverse direction without welding the dowel basket sections to each other.

7. The field-assembly dowel basket of claim 6, wherein:
the dowel basket and a removable concrete form extending in the transverse direction between the frame wires support the dowel sleeves housing the dowels above a base while concrete is poured onto the base over a first portion of the dowel basket on one side of the removable form;
the dowel basket allows the removable concrete form to be removed after the concrete is poured over the first portion of the dowel basket and before concrete is poured over a second portion of the dowel basket.

8. The field-assembly dowel basket of claim 6, each frame wire has a "W" shape, each shipping wire has a straight shape, and each connector has a "T" shape.

9. The field-assembly dowel basket of claim 8, wherein the wire segments consist essentially of the "W" shape frame wires and the straight shipping wires, and the connectors consist essentially of the "T" shape connectors.

10. The field-assembly dowel basket of claim 6, wherein each dowel sleeve is a closed-channel sleeve coextensive in the lateral direction with an associated dowel, further comprising tape over end openings of each dowel sleeve.

11. The field-assembly dowel basket of claim 6, wherein each dowel sleeve is an open-channel sleeve coextensive in the lateral direction with an associated dowel.

12. The field-assembly dowel basket of claim 11, further comprising tape over the open channel and end openings of the dowel sleeve.

13. A method for constructing a concrete structure at a construction site, comprising:
- manufacturing or obtaining components including wire segments, dowels and dowel sleeves of field-assembly dowel baskets excluding welds attaching the wire components to each other;
- transporting the components in bulk quantities to the construction site;
- assembling a dowel basket of desired length from the components at the construction site without welding of the wire segments to each other, wherein the dowel basket comprises a plurality of dowel basket sections connected together to create a dowel basket of desired length, wherein each dowel basket section comprises:
  - a plurality of dowels elongated in a lateral direction,
  - a plurality of dowel sleeves elongated in the lateral direction configured to loosely house the dowels,
  - a plurality of wire segments,
  - a plurality of connectors attachable to the wire segments,
  - wherein the wire segments of each dowel basket section comprise a pair of opposing frame wires,
  - wherein each dowel sleeve comprises a pair of recesses, each receiving a portion of one of the opposing frame wires through a snap-in interference fit, to position the pair of opposing frame wires to extend in a transverse direction perpendicular to the lateral direction spaced apart from each other in the lateral direction,
  - wherein each dowel basket section comprises two frame wires, two dowels sleeves supported by the frame wires, two dowels loosely held within respective dowel sleeves, and two connectors,
  - wherein each connector connects a shipping wire between the opposing frame wires of a dowel basket section, and connects aligned frame wires of adjacent dowel basket sections to each other, to assemble the dowel basket sections into a multi-section dowel basket comprising a plurality of dowel basket sections aligned in the transverse direction without welding the dowel basket sections to each other;
- positioning the dowel basket at the edge of a first concrete slab to be poured;
- positioning a concrete form around dowels of the dowel basket, wherein the form comprises notches configured to accommodate the dowels;
- pouring the first concrete slab so that a first portion of each dowel basket is embedded in the first slab and a second portion of each dowel basket extends from the first slab;
- after the first slab sets, removing the form and pouring a second concrete slab adjacent to the first concrete slab over the second portions of the dowel basket so that the dowels span a joint between the first and second concrete slabs.

14. The method of claim 13, wherein the wire segments comprise a plurality of "W" shape frame wires and a plurality of shipping wires.

15. The method of claim 13, wherein the connectors comprise "T" connectors.

16. The method of claim 13, wherein the wire segments consist essentially of "W" shape frame wires and straight shipping wires, and the connectors consist essentially of "T" shape connectors.

17. The method of claim 13, further comprising placing tape over end openings of each dowel sleeve.

18. The method of claim 13, wherein each dowel sleeve is an open-channel sleeve coextensive in the lateral direction with an associated dowel.

19. The method of claim 13 further comprising placing tape over the open channel and end openings of each dowel sleeve.

20. The method of claim 13, further comprising selecting the dowels from the group comprising round rod dowels and flat rectangular plate dowels.

* * * * *